United States Patent
McCaffrey

(10) Patent No.: US 10,563,531 B2
(45) Date of Patent: Feb. 18, 2020

(54) SEAL ASSEMBLY FOR GAS TURBINE ENGINE

(71) Applicant: United Technologies Corporation, Farmington, CT (US)

(72) Inventor: Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1112 days.

(21) Appl. No.: 15/071,317

(22) Filed: Mar. 16, 2016

(65) Prior Publication Data

US 2019/0285002 A1  Sep. 19, 2019

(51) Int. Cl.
F01D 11/00 (2006.01)
F01D 11/08 (2006.01)

(52) U.S. Cl.
CPC ............ *F01D 11/005* (2013.01); *F01D 11/08* (2013.01)

(58) Field of Classification Search
CPC .............................. F01D 11/005; F01D 11/08
See application file for complete search history.

(56) References Cited

U.S. PATENT DOCUMENTS

| | | | |
|---|---|---|---|
| 4,087,199 A | 5/1978 | Hemsworth et al. | |
| 4,314,792 A * | 2/1982 | Chaplin | F01D 9/041 415/116 |
| 4,527,385 A | 7/1985 | Jumelle et al. | |
| 4,668,164 A * | 5/1987 | Neal | F01D 9/041 415/116 |
| 4,728,257 A * | 3/1988 | Handschuh | F01D 11/24 415/136 |
| 4,752,184 A * | 6/1988 | Liang | F01D 11/08 415/116 |
| 5,609,469 A | 3/1997 | Worley et al. | |
| 5,639,210 A | 6/1997 | Carpenter et al. | |
| 6,142,731 A | 11/2000 | Dewis et al. | |
| 6,406,256 B1 * | 6/2002 | Marx | F01D 11/16 415/138 |
| 6,431,825 B1 | 8/2002 | McLean | |
| 6,726,448 B2 | 4/2004 | McGrath et al. | |

(Continued)

FOREIGN PATENT DOCUMENTS

| | | |
|---|---|---|
| EP | 2434106 | 3/2012 |
| WO | 2014163674 | 10/2014 |

(Continued)

OTHER PUBLICATIONS

Extended European Search Report for European Patent Application No. 17160070.3 completed Jul. 12, 2017.

*Primary Examiner* — Woody A Lee, Jr.
(74) *Attorney, Agent, or Firm* — Carlson, Gaskey & Olds, P.C.

(57) ABSTRACT

A seal assembly for a gas turbine engine according to an example of the present disclosure includes, among other things, a seal including a sealing portion and an engagement portion. A support includes an interface portion and a mounting portion. The interface portion defines a retention slot spaced apart from opposing mate faces. The mounting portion is configured to be fixedly attached to an engine static structure. The engagement portion is dimensioned to be slideably received within the retention slot.

21 Claims, 4 Drawing Sheets

(56) References Cited

U.S. PATENT DOCUMENTS

| | | | |
|---|---|---|---|
| 6,733,235 B2 | 5/2004 | Alford et al. | |
| 7,052,235 B2 * | 5/2006 | Alford | F01D 9/04 |
| | | | 415/173.1 |
| 7,163,206 B2 | 1/2007 | Cross et al. | |
| 7,435,049 B2 | 10/2008 | Ghasripoor et al. | |
| 7,527,472 B2 | 5/2009 | Allen | |
| 7,959,407 B2 | 6/2011 | Tholen | |
| 8,123,466 B2 | 2/2012 | Pietraszkiewicz et al. | |
| 8,303,247 B2 | 11/2012 | Schlichting et al. | |
| 8,439,636 B1 | 5/2013 | Liang | |
| 8,534,995 B2 * | 9/2013 | McCaffrey | F01D 11/08 |
| | | | 415/173.1 |
| 8,568,091 B2 | 10/2013 | McCaffrey | |
| 8,585,357 B2 | 11/2013 | DiPaola et al. | |
| 8,596,963 B1 | 12/2013 | Liang | |
| 8,790,067 B2 | 7/2014 | McCaffrey et al. | |
| 8,876,458 B2 | 11/2014 | Thibodeau et al. | |
| 8,920,127 B2 | 12/2014 | McCaffrey | |
| 8,944,756 B2 | 2/2015 | Lagueux | |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 9,447,696 B2 * | 9/2016 | McCaffrey | F01D 11/18 |
| 2003/0185674 A1 * | 10/2003 | Alford | F01D 11/08 |
| | | | 415/173.1 |
| 2006/0038358 A1 | 2/2006 | James | |
| 2008/0159850 A1 * | 7/2008 | Tholen | F01D 11/12 |
| | | | 415/139 |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2010/0226760 A1 | 9/2010 | McCaffrey | |
| 2011/0044803 A1 | 2/2011 | Di Paola et al. | |
| 2011/0044804 A1 | 2/2011 | DiPaola et al. | |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0022469 A1 | 1/2013 | McCaffrey | |
| 2013/0113168 A1 | 5/2013 | Lutjen et al. | |
| 2013/0170963 A1 * | 7/2013 | Mironets | F01D 11/12 |
| | | | 415/173.1 |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2014/0271145 A1 * | 9/2014 | Thomas | F01D 11/08 |
| | | | 415/173.1 |
| 2015/0016954 A1 | 1/2015 | Thibodeau et al. | |
| 2015/0031764 A1 | 1/2015 | Kraus et al. | |
| 2015/0226132 A1 | 8/2015 | Roy Thill et al. | |
| 2015/0337672 A1 | 11/2015 | McCaffrey et al. | |
| 2015/0369076 A1 | 12/2015 | McCaffrey et al. | |
| 2016/0003078 A1 | 1/2016 | Stevens et al. | |
| 2016/0003080 A1 | 1/2016 | Mcgarrah | |
| 2016/0215645 A1 * | 7/2016 | McCaffrey | F01D 25/246 |
| 2018/0320541 A1 * | 11/2018 | Zelesky | F01D 11/24 |

FOREIGN PATENT DOCUMENTS

| | | |
|---|---|---|
| WO | 2015038341 | 3/2015 |
| WO | 2015038906 | 3/2015 |
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

\* cited by examiner

SEAL ASSEMBLY FOR GAS TURBINE ENGINE

BACKGROUND

This disclosure relates to sealing components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY

A seal assembly for a gas turbine engine according to an example of the present disclosure includes a seal including a sealing portion and an engagement portion. A support includes an interface portion and a mounting portion. The interface portion defines a retention slot spaced apart from opposing mate faces. The mounting portion is configured to be fixedly attached to an engine static structure. The engagement portion is dimensioned to be slideably received within the retention slot.

In a further embodiment of any of the foregoing embodiments, the interface portion includes opposed guide members extending inwardly from walls of the retention slot to limit relative movement of the engagement portion in the retention slot.

In a further embodiment of any of the foregoing embodiments, the interface portion includes a first end portion and a second end portion each extending between the guide members. The first end portion defines an opening configured to receive a portion of the engagement portion in the retention slot. The second end portion is configured to limit relative movement of the engagement portion in the retention slot.

In a further embodiment of any of the foregoing embodiments, the engagement portion includes one or more attachment members substantially adjacent to opposed circumferential sides of the sealing portion. Each of the one or more attachment members is configured to mate with a corresponding one of the guide members.

In a further embodiment of any of the foregoing embodiments, the engagement portion has a dovetail geometry, and the guide members are configured to mate with surfaces of the dovetail geometry.

In a further embodiment of any of the foregoing embodiments, the seal is made of a first material, and the support is made of a second, different material.

In a further embodiment of any of the foregoing embodiments, the first material includes a ceramic material, and the seal has a monolithic construction.

In a further embodiment of any of the foregoing embodiments, the support defines a seal cavity configured to receive a wedge seal. The wedge seal is configured to abut against sealing surfaces of the seal.

In a further embodiment of any of the foregoing embodiments, the seal cavity is dimensioned such that an apex of the wedge seal is situated along an intersegment gap defined by one of the mate faces when the wedge seal is located in an installed position.

A gas turbine engine according to an example of the present disclosure includes an engine case extending along an engine axis, an array of blades rotatable about the engine axis, and an array of blade outer air seal assemblies adjacent to the array of blades. Each of the blade outer air seal assemblies include a blade outer air seal including a sealing portion and an engagement portion. The sealing portion is configured to bound a core flow path. A support includes an interface portion and a mounting portion. The interface portion defines a retention slot spaced apart from opposed mate faces, and the mounting portion is configured to be fixedly attached to the engine case. The engagement portion is moveable in a first direction substantially parallel to the engine axis such that the engagement portion is slideably received within the retention slot.

A further embodiment of any of the foregoing embodiments includes a wedge seal configured to abut against sealing surfaces of adjacent blade outer air seals.

In a further embodiment of any of the foregoing embodiments, an apex of the wedge seal is situated along an intersegment gap defined by adjacent mate faces.

In a further embodiment of any of the foregoing embodiments, the support of at least one of the adjacent blade outer air seals defines a seal cavity configured to receive the wedge seal.

A further embodiment of any of the foregoing embodiments includes an annular retention member configured to oppose axial movement of the blade outer air seal of one or more of the seal assemblies within the corresponding retention slot.

In a further embodiment of any of the foregoing embodiments, the annular retention member is configured to bias the blade outer air seal of the one or more of the seal assemblies in the first direction.

A method of sealing of a gas turbine engine according to an example of the present disclosure includes providing a support including an interface portion and a mounting portion, the interface portion defining a retention slot spaced apart from opposing mate faces, and attaching the mounting portion to an engine case. The engine case is arranged about an engine axis providing a blade outer air seal including a sealing portion and an engagement portion. The method includes slideably moving the engagement portion in a first direction within the retention slot. The first direction is substantially parallel to the engine axis.

In a further embodiment of any of the foregoing embodiments, the step of slideably moving the engagement portion includes moving the engagement portion through an opening to the retention slot and into abutment with an end wall of the interface portion. The end wall extends between opposing guide members bounding the retention slot.

A further embodiment of any of the foregoing embodiments includes positioning an annular retention member relative to the engagement portion such that the blade outer air seal is biased in the first direction against the end wall.

In a further embodiment of any of the foregoing embodiments, the step of positioning the annular retention member includes biasing the blade outer air seal away from an engine static structure.

A further embodiment of any of the foregoing embodiments includes positioning a wedge seal relative to the support such that an apex of the wedge seal is situated in an intersegment gap defined by one of the mate faces and surfaces of the wedge seal abut against sealing surfaces of the blade outer air seal.

The various features and advantages of this invention will become apparent to those skilled in the art from the following detailed description of an embodiment. The drawings that accompany the detailed description can be briefly described as follows.

DETAILED DESCRIPTION

Figure 1:
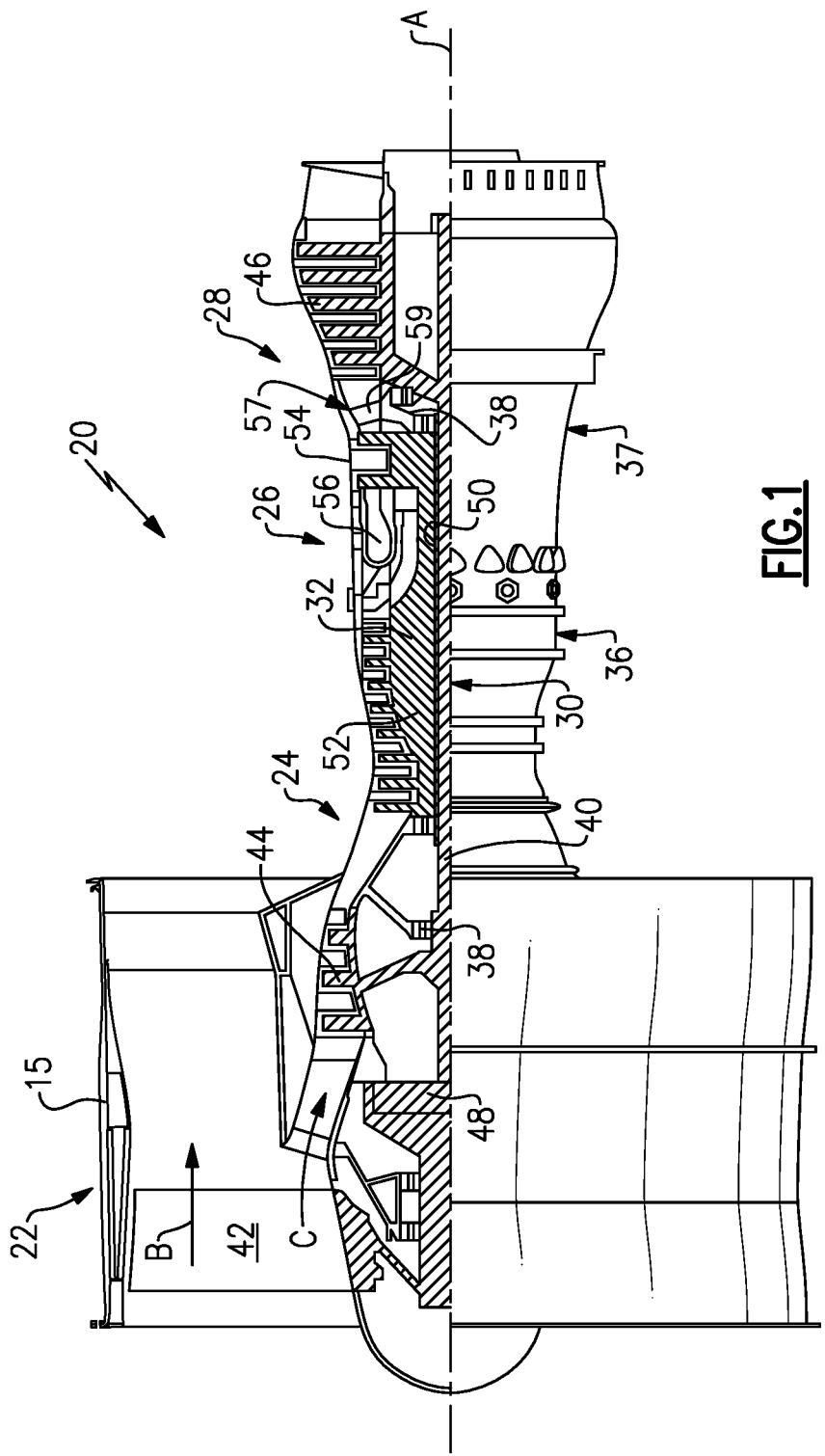
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
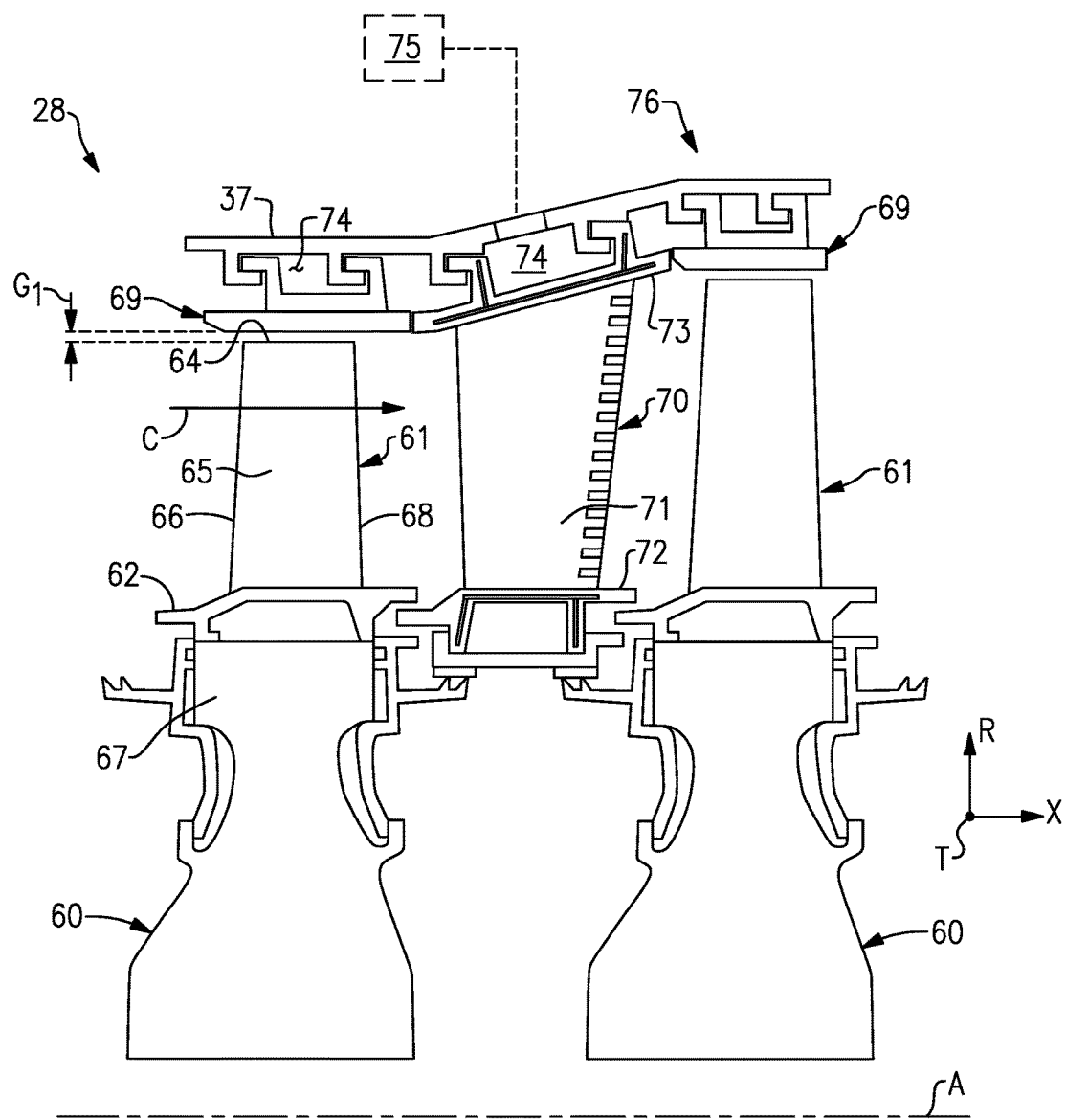
FIG. 2 schematically shows an airfoil arrangement for a turbine section.

FIG. 2 shows selected portions of the turbine section 28 including a rotor 60 carrying one or more airfoils 61 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments (one shown in FIG. 3 at 169) that are circumferentially arranged in an annulus around the central axis A of the engine 20. A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A.

The outer platform 73 of vane 70 and the BOAS 69 can define one or more cooling cavities 74. The cooling cavities 74 are configured to receive cooling flow from one or more cooling sources 75 to cool portions of the airfoil 61, BOAS 69 and/or vane 70. Cooling sources 75 can include bleed air from an upstream stage of the compressor section 24 (FIG. 1), bypass air, or a secondary cooling system aboard the aircraft, for example. Each of the cooling cavities 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that escapes around the airfoil sections 65 through a corresponding clearance gap $G_1$. The engine 20 can include an active or passive clearance control system to adjust the clearance gap $G_1$ to a desired dimension during one or more conditions of the engine 20. In one example, cooling source 75 is configured to provide cooling air to engine case 37 surrounding the BOAS 69 or another portion of the engine static structure 36 to expand and contract the engine case 37, thereby adjusting a radial position of the BOAS 69 relative to the tips 64 of adjacent airfoils 61. In alternative examples utilizing an active clearance control (ACC) system, a relative position of the BOAS 69 and the engine case 37 can be adjusted to vary a dimension of the clearance gap $G_1$.

Figure 3:
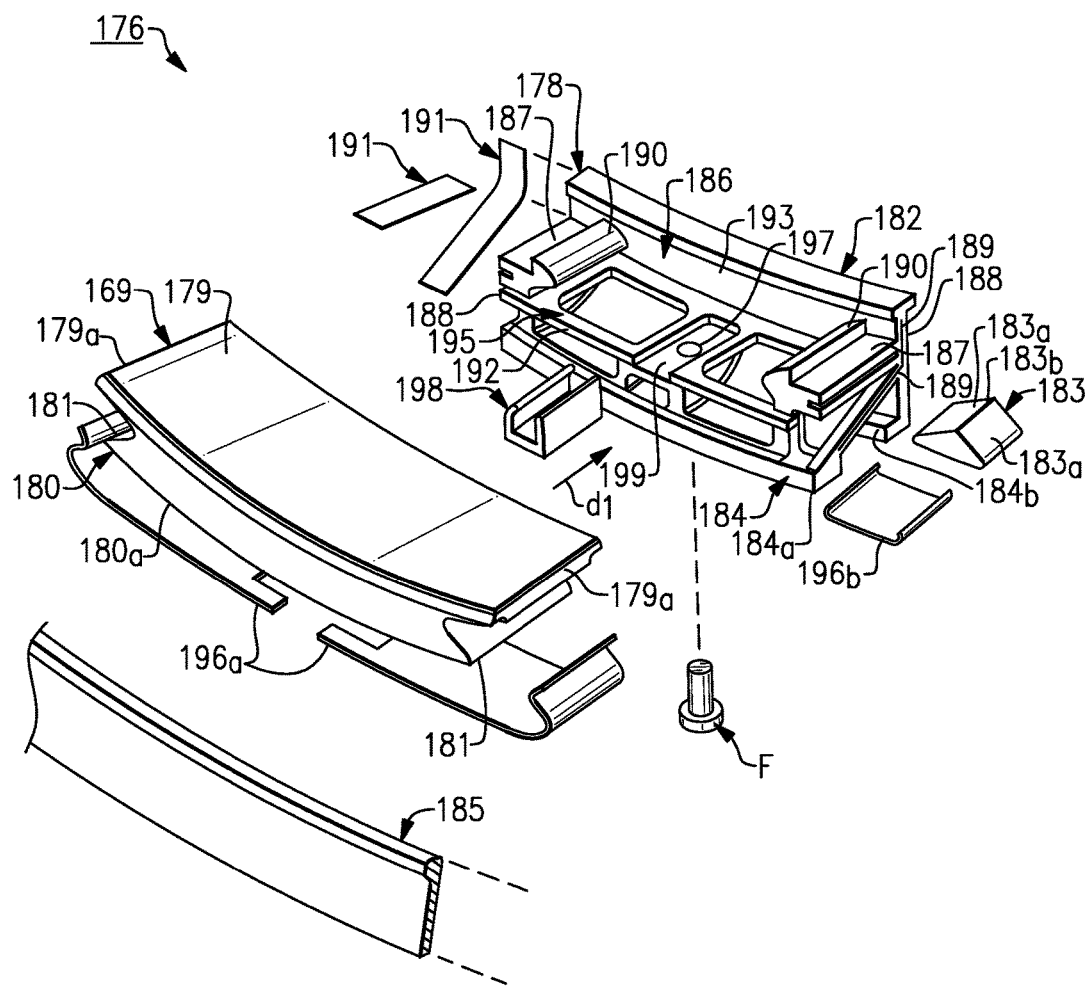
FIG. 3 illustrates an exploded perspective view of a seal assembly.
Figure 4:
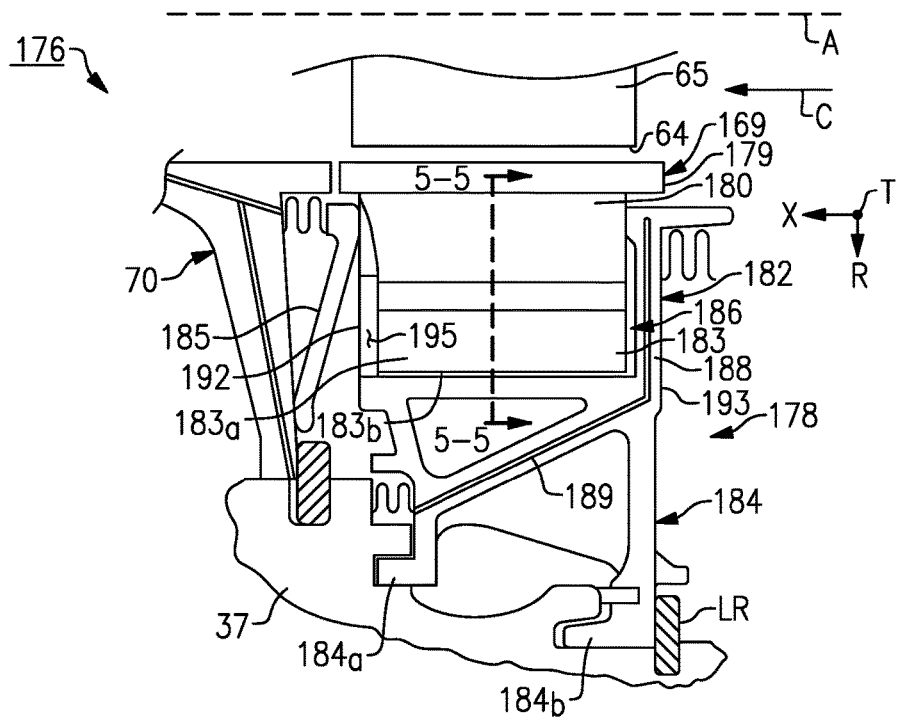
FIG. 4 illustrates a side view of the seal assembly of FIG. 3 in an installed position.
Figure 5:
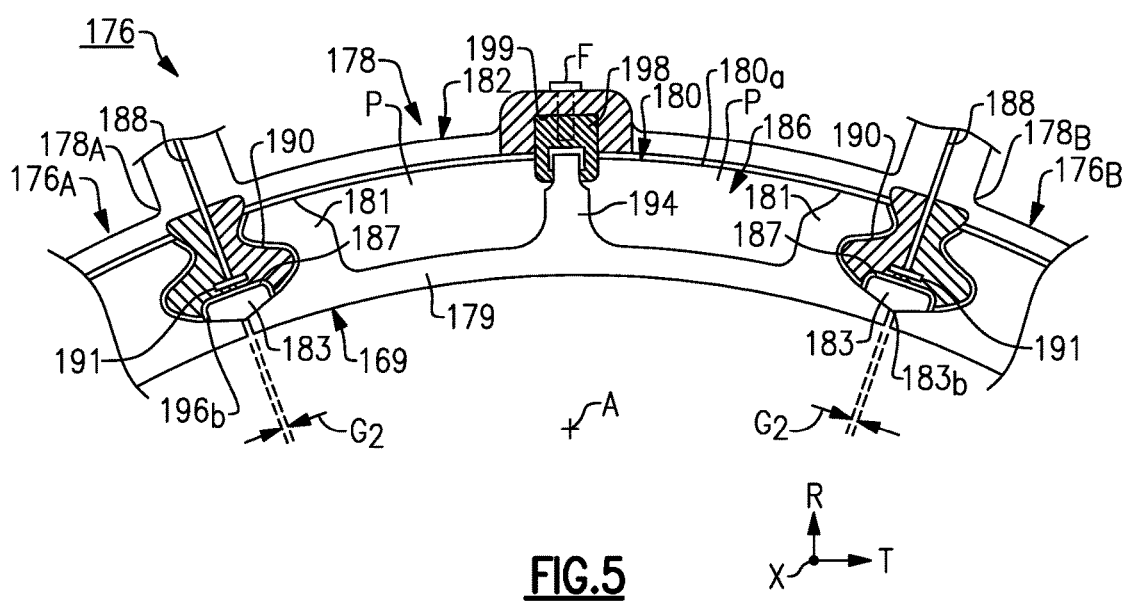
FIG. 5 illustrates a cross-sectional view of the seal assembly of FIG. 4 taken along line 5-5.

FIGS. 3-5 illustrate an exemplary seal assembly 176 for supporting components of a gas turbine engine. FIG. 3 is an exploded perspective view of the seal assembly 176 in an uninstalled position. FIG. 4 is a side view of the seal assembly 176 in an installed position. FIG. 5 is a cross-sectional view of selected portions of the seal assembly 176 arranged adjacent to seal assemblies $176_A$, $176_B$. Although the components discussed herein primarily refer to BOAS 169 in turbine section 28, the teachings herein can also be utilized for other components of the engine 20, such as an upstream stage of the compressor section 24, or combustor panels defining portions of a combustion chamber located in the combustor section 26, and bearing seal arrangements.

The seal assembly 176 includes a BOAS 169 and a carriage or support 178. In the illustrated example, the seal assembly 176 includes a single BOAS 169 or single seal arc segment coupled to a single support 178. In other examples, the BOAS 169 includes multiple seal arc segments. As will be appreciated, the examples herein may be used to provide compliant, low-stress mounting of the BOAS 169 in the support 178. In particular such compliant low-stress mounting may be useful for BOAS 169 formed of materials that are sensitive to stress concentrations, although this disclosure is not limited and other types of seals and materials will also benefit.

The support 178 includes an interface portion 182 extending from a mounting portion 184. The interface portion 182 can be integrally formed with the mounting portion 184 to reduce thermal distortion, or can include multiple components fixedly attached to each other. The mounting portion 184 is configured to be fixedly attached to engine case 37 or another portion of the engine static structure 36. The mounting portion 184 includes one or more attachment members, such as attachment members 184a, 184b, configured to be received within a corresponding attachment slot of the engine case 37. Lock ring LR (FIG. 4) can be brought into abutment with attachment member 184b to secure the mounting portion 184. In alternative examples, the mounting portion 184 is bolted or welded to the engine static structure 36.

The support 178 is operable to transfer loads applied from the BOAS 169 to the engine case 37, improving the ability of BOAS 169 to thermally react to loads from the core flow path C, and minimize or otherwise reduce external loads applied to the BOAS 169 from mounting hardware or adjacent engine static structure 36. The mounting portion 184 can be precisely fabricated, machined or otherwise formed to a desired geometry to reduce part-to-part variation and tolerance mismatch with corresponding attachment points of the engine static structure 36. The support 178 can be configured to provide a desired rigidity, thereby improving sealing characteristics of the BOAS 169. The support 178 can also reduce axial and/or radial mismatch of adjacent BOAS 169, thereby reducing leaking of cooling airflow through intersegment gaps $G_2$ (FIG. 5) between adjacent BOAS 169.

The BOAS 169 includes a sealing portion 179 and an engagement portion 180 extending from the sealing portion 179. The sealing portion 179 can have a generally arcuate geometry and a substantially continuous sealing surface across an arc length of the sealing portion 179 to bound portions of the core flow path C (FIG. 2).

Although not limited, each seal arc segment of the BOAS 169 (i.e., the body thereof) may be a monolithic body that is formed of a high thermal-resistance, low-toughness material. For example, each seal arc segment may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). Alternatively, each seal arc segment may be formed of high-toughness material, such as but not limited to metallic alloys. In other examples, the BOAS 169 is made of multiple portions fixedly attached to each other. The BOAS 169 can be made of a first material such as any material described herein, and the support 178 can be made of a second, different material. In some examples, the support 178 is made from a high temperature metal or metal alloy.

The engagement portion 180 of BOAS 169 is dimensioned to be slideably received and secured within a retention slot 186 defined by the interface portion 182. The retention slot 186 is spaced apart from the opposing mate faces 188 and can extend in a direction substantially parallel to the engine axis A. The support 178 includes a first (or leading) end portion 192 and a second (or trailing) end portion 193 each extending substantially between opposed seal supports or guide members 190. The retention slot 186 extends generally in an axial direction between the first and second end portions 192, 193. The first end portion 192 defines an opening 195 configured to receive a portion of the engagement portion 180 in the retention slot 186. The second end portion 193 is configured to limit relative movement of the engagement portion 180 in the retention slot 186. The engagement portion 180 of BOAS 169 can be moved in a first direction di, which may be substantially parallel to the engine axis A, through the opening 195 to the retention slot 186, and into abutment with the second end portion 193.

The engagement portion 180 of BOAS 169 includes one or more attachment members 181 that are configured to mate with the guide members 190. In the illustrated example, the engagement portion 180 has a dovetail geometry, which is at least partially defined by the attachment members 181 substantially adjacent to opposed circumferential sides 179*a* of the sealing portion 179. The guide members 190 are configured to mate with surfaces of the dovetail geometry of the engagement portion 180 along the circumferential sides 179*a*. The guide members 190 extend inwardly to trap the engagement portion 180 at least partially in the retention slot 186, and limit radial and/or circumferential movement of the BOAS 169 relative to the support 178. The engagement portion 180 and/or retention slot 186 can be precisely machined or otherwise formed relative to each other to provide a desired tolerance to reduce loading on the BOAS 169. One or more shims 196*a* can be positioned between surfaces of the BOAS 169 and surfaces of the retention slot 186.

Each of the mate faces 188 defines an intersegment gap $G_2$ with a mate face 188 of an adjacent support 178 when the seal assembly 176 is located in an installed position. The intersegment gap $G_2$ extends generally in the axial and circumferential directions adjacent to the core flow path C. The mate faces 188 can define one or more grooves 189 to receive one or more seals 191, such as feather seals. The seals 191 are situated across the intersegment gaps $G_2$ to reduce cooling flow or leakage between the cavities 74 (FIG. 2) and the core flow path C.

The seal assembly 176 can include an elongated key member 198 configured to receive or otherwise engage retention post 194 (FIG. 5) of engagement portion 180. The retention post 194 can be positioned between one or more pockets P (FIG. 5) extending inwardly from side 180*a* of engagement portion 180 opposite the seal portion 179. The interface portion 182 defines a longitudinal slot 199 extending from the retention slot 186 for receiving at least a portion of the key member 198. The longitudinal slot 199 and key member 198 can be dimensioned to extend substantially between the first and second end portions 192, 193, with ends of the key member 198 abutting surfaces of the pockets P. The interface portion 182 can define at least one opening 197 configured to receive at least one fastener F to secure the key member 198 and/or BOAS 169 within the retention slot 186. The retention post 194 can be positioned substantially at a circumferential midpoint between attachment members 181. The arrangement of the retention post 194 can reduce tilting or rotation of the BOAS 169 relative to the support 178, thereby reducing asymmetrical loading and wear on attachment members 181 of BOAS 169. In alternative examples, the pockets P are eliminated such that surfaces of the engagement portion 180 along the side 180*a* are substantially continuous and may complement the retention slot 193.

A retention member 185 can be positioned adjacent to the BOAS 169 to oppose axial movement of the BOAS 169 within the retention slot 186. The retention member 185 can include one or more arcuate segments arranged circumferentially about the engine axis A. In the illustrated example, the retention member 185 has a substantially annular or hoop-shape geometry extending about the engine axis A. The retention member 185 can define a spring constant such that the retention member 185 biases the BOAS 169 away from an adjacent vane 70 or an adjacent portion of the engine static structure 36. In alternative examples, the annular retention member 185 is substantially rigid. The retention member 185 can be made of a high temperature material that is relatively insensitive to temperature variations to provide a relatively consistent axial load relative to the engine axis A.

The support 178 defines a seal cavity 187 configured to receive an elongated wedge seal 183 to reduce leakage through the intersegment gap $G_2$. The wedge seal 183 includes two or more sides 183*a* sloping towards and joined at an apex 183*b*. The sides 183*a* are configured to abut against sealing surfaces of the blade outer air seal 169 to provide a sealing relationship, as shown in FIG. 5. The seal cavity 187 can be dimensioned such that the apex 183*b* is situated along a reference plane defined by an adjacent one of the mate faces 188. The apex 183*b* can be positioned within, or otherwise adjacent to, intersegment gap $G_2$. The wedge seal 183 is configured to adjust to radial and/or axial variations between an adjacent one of the seal assemblies 176$_A$, 176$_B$ due to expansion/contraction of the engine case 37 or other adjacent engine static structure 36. The wedge seal 183 can be fabricated of a ceramic or ceramic composite such as silicon nitride or a nickel-based superalloy. Shim 196*b* can be positioned adjacent to wedge seal 183, and can define a spring constant to bias the wedge seal 183 toward sealing surfaces of the BOAS 169.

Installation of the seal assembly 176 is as follows. The mounting portion 184 of the support 178 is attached to the engine case 37. Key member 198 and retention post 194 are brought into engagement. The engagement portion 180 of BOAS 169 and key member 198 are slideably moved in the first direction di within the retention slot 186 and into abutment with the second end portion 193. The key member 198 is fastened to the interface portion 182. Wedge seals 183 are situated in corresponding seal cavities 187 and into abutment against the sealing surfaces of the BOAS 169. The BOAS 169 can be installed within the retention slot 186 subsequent to attachment of the mounting portion 184 to the engine case 37 to reduce overall handling of BOAS 169, although the BOAS 169 can be installed within the retention slot 186 prior to attachment of the mounting portion 184. Retention member 185 is positioned into abutment against surfaces of the BOAS 169 and/or the support 178 to secure the engagement portion 180 of BOAS 169 within the retention slot 186.

The seal assembly 176 according to the teachings herein can reduce impact and mechanical loading to BOAS 169, which may be caused by relative movement of the surrounding engine static structure 36 due to thermal contraction/expansion and/or bending during operation of engine 20, for example. The seal assembly 176 can be configured to fully or substantially isolate BOAS 169 from external loading by separating the BOAS 169 from load paths of the adjacent engine static structure 36, with the BOAS 169 having the ability to expand and contract with the engine case 37 to reduce leakage through the corresponding clearance gap $G_1$.

It should be understood that relative positional terms such as "forward," "aft," "upper," "lower," "above," "below," and the like are with reference to the normal operational attitude of the vehicle and should not be considered otherwise limiting. Although the different examples have the specific components shown in the illustrations, embodiments of this disclosure are not limited to those particular combinations. It is possible to use some of the components or features from one of the examples in combination with features or components from another one of the examples. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine, comprising:
a seal including a sealing portion and an engagement portion;
a support including an interface portion and a mounting portion, the interface portion defining a retention slot spaced apart from opposing mate faces, and the mounting portion configured to be fixedly attached to an engine static structure;
wherein the engagement portion is dimensioned to be slideably received within the retention slot; and
wherein the interface portion includes opposed guide members extending inwardly from walls of the retention slot to limit relative movement of the engagement portion in the retention slot, and each one of the guide members extends along a respective one of the opposing mate faces.

2. The seal assembly as recited in claim 1, wherein:
the engagement portion includes one or more attachment members substantially adjacent to opposed circumferential sides of the sealing portion, each of the one or more attachment members configured to mate with a corresponding one of the guide members;
the engagement portion has a dovetail geometry, and the guide members are configured to mate with surfaces of the dovetail geometry;
the support defines a seal cavity configured to receive a wedge seal, the wedge seal configured to abut against sealing surfaces of the seal; and
the seal cavity is dimensioned such that an apex of the wedge seal is situated along an intersegment gap defined by one of the mate faces when the wedge seal is located in an installed position.

3. The seal assembly as recited in claim 2, wherein:
the seal is made of a first material, and the support is made of a second, different material; and
the first material includes a ceramic material, and the seal has a monolithic construction.

4. A seal assembly for a gas turbine engine comprising:
a seal including a sealing portion and an engagement portion;
a support including an interface portion and a mounting portion, the interface portion defining a retention slot spaced apart from opposing mate faces, and the mounting portion configured to be fixedly attached to an engine static structure;
wherein the engagement portion is dimensioned to be slideably received within the retention slot;
wherein the interface portion includes opposed guide members extending inwardly from walls of the retention slot to limit relative movement of the engagement portion in the retention slot; and
wherein the interface portion includes a first end portion and a second end portion each extending between the guide members, the first end portion defining an opening configured to receive a portion of the engagement portion in the retention slot, and the second end portion configured to limit relative movement of the engagement portion in the retention slot.

5. The seal assembly as recited in claim 4, wherein the engagement portion includes one or more attachment members substantially adjacent to opposed circumferential sides of the sealing portion, each of the one or more attachment members configured to mate with a corresponding one of the guide members.

6. The seal assembly as recited in claim 4, wherein the engagement portion has a dovetail geometry, and the guide members are configured to mate with surfaces of the dovetail geometry.

7. The seal assembly as recited in claim 4, wherein the seal is made of a first material, and the support is made of a second, different material.

8. The seal assembly as recited in claim 7, wherein the first material includes a ceramic material, and the seal has a monolithic construction.

9. The seal assembly as recited in claim 4, wherein the support defines a seal cavity configured to receive a wedge seal, the wedge seal configured to abut against sealing surfaces of the seal.

10. The gas turbine engine as recited in claim 9, wherein the seal cavity is dimensioned such that an apex of the wedge seal is situated along an intersegment gap defined by one of the mate faces when the wedge seal is located in an installed position.

11. The seal assembly as recited in claim 4, wherein each one of the guide members extends along a respective one of the opposing mate faces.

12. A gas turbine engine, comprising:
an engine case extending along an engine axis;
an array of blades rotatable about the engine axis; and
an array of blade outer air seal assemblies adjacent to the array of blades, each of the blade outer air seal assemblies comprising:
a blade outer air seal including a sealing portion and an engagement portion, the sealing portion configured to bound a core flow path;
a support including an interface portion and a mounting portion, the interface portion defining a retention slot spaced apart from opposed mate faces, and the mounting portion configured to be fixedly attached to the engine case;
wherein the engagement portion is moveable in a first direction substantially parallel to the engine axis such that the engagement portion is slideably received within the retention slot; and
an annular retention member configured to oppose axial movement of the blade outer air seal of one or more of the seal assemblies within the corresponding retention slot.

13. The gas turbine engine as recited in claim 12, comprising a wedge seal configured to abut against sealing surfaces of adjacent blade outer air seals.

14. The gas turbine engine as recited in claim 13, wherein an apex of the wedge seal is situated along an intersegment gap defined by adjacent mate faces.

15. The gas turbine engine as recited in claim 13, wherein the support of at least one of the adjacent blade outer air seals defines a seal cavity configured to receive the wedge seal.

16. The gas turbine engine as recited in claim 12, wherein the annular retention member is configured to bias the blade outer air seal of the one or more of the seal assemblies in the first direction.

17. A method of sealing of a gas turbine engine, comprising:
provaiding a support including an interface portion and a mounting portion, the interface portion defining a retention slot spaced apart from opposing mate faces;
attaching the mounting portion to an engine case, the engine case arranged about an engine axis;
providing a blade outer air seal including a sealing portion and an engagement portion;
slideably moving the engagement portion in a first direction within the retention slot, the first direction being substantially parallel to the engine axis; and
positioning an annular retention member relative to the engagement portion such that the blade outer air seal is biased in the first direction against an end wall of the interface portion.

18. The method as recited in claim 17, wherein the step of slideably moving the engagement portion includes moving the engagement portion through an opening to the retention slot and into abutment with the end wall of the interface portion, the end wall extending between opposing guide members bounding the retention slot.

19. The method as recited in claim 17, wherein the step of positioning the annular retention member includes biasing the blade outer air seal away from an engine static structure.

20. The method as recited in claim 17, comprising positioning a wedge seal relative to the support such that an apex of the wedge seal is situated in an intersegment gap defined by one of the mate faces and surfaces of the wedge seal abut against sealing surfaces of the blade outer air seal.

21. The gas turbine engine as recited in claim 16, wherein the interface portion includes opposed guide members extending inwardly from walls of the retention slot to limit relative movement of the engagement portion in the retention slot, and each one of the guide members extends along a respective one of the opposed mate faces.

* * * * *